PRECISION SWEEP CALIBRATOR

Filed March 14, 1952 2 Sheets-Sheet 1

INVENTOR
Kenneth L. Chapman,
BY C. B. Hamilton.
ATTORNEY

Oct. 4, 1955 K. L. CHAPMAN 2,719,917

PRECISION SWEEP CALIBRATOR

Filed March 14, 1952 2 Sheets-Sheet 2

INVENTOR

Kenneth L. Chapman,

By C. B. Hamilton, ATTORNEY

United States Patent Office 2,719,917

Patented Oct. 4, 1955

2,719,917

PRECISION SWEEP CALIBRATOR

Kenneth L. Chapman, Winston-Salem, N. C., assignor to Western Electric Company, Incorporated, New York, N. Y., a corporation of New York Application March 14, 1952, Serial No. 276,599

11 Claims. (Cl. 250—27)

This invention pertains to calibrating systems, and particularly to precision sweep calibrating systems used for comparing the horizontal deflection speed of a cathode ray tube electron beam with a wave form of known time duration.

One object of this invention is to provide an adjustable continuous wave crystal oscillator located in a temperature controlled atmosphere, having a regulated voltage supply, and being isolated from its load by a buffer amplifier, thereby producing a highly stable calibrating signal that can be used with instruments employing triggered sweeps, start-stop sweeps, or continuous sweeps.

Another object is to provide a synchronizing pulse that is a sub-multiple of a calibrating signal, and a delay control to shift the synchronizing pulse with respect to the calibrating signal.

Another object is a provision for producing a high amplitude calibrating signal so that a pattern can be observed on a cathode-ray tube screen without additional amplification.

Another object is a provision for adjusting a calibrating signal to operate at exactly the same frequency as a standardizing signal such as that broadcast by the United States Bureau of Standards.

With these and other objects in view, one embodiment of the invention comprises an accurately adjustable crystal-controlled oscillator for producing a calibrating signal, a buffer amplifier coupled to the oscillator for amplifying the calibrating signal and for shielding said oscillator from loading effects, a plurality of dividing circuits connected in cascade and energized by a portion of the calibrating signal for producing a sub-multiple frequency thereof, a pulse forming circuit coupled to the dividing circuits for producing a synchronizing pulse having a repetition rate equal to said sub-multiple frequency, and a delay network coupled to the pulse forming network for delaying the synchronizing pulse with respect to the calibrating signal.

Figure 1:
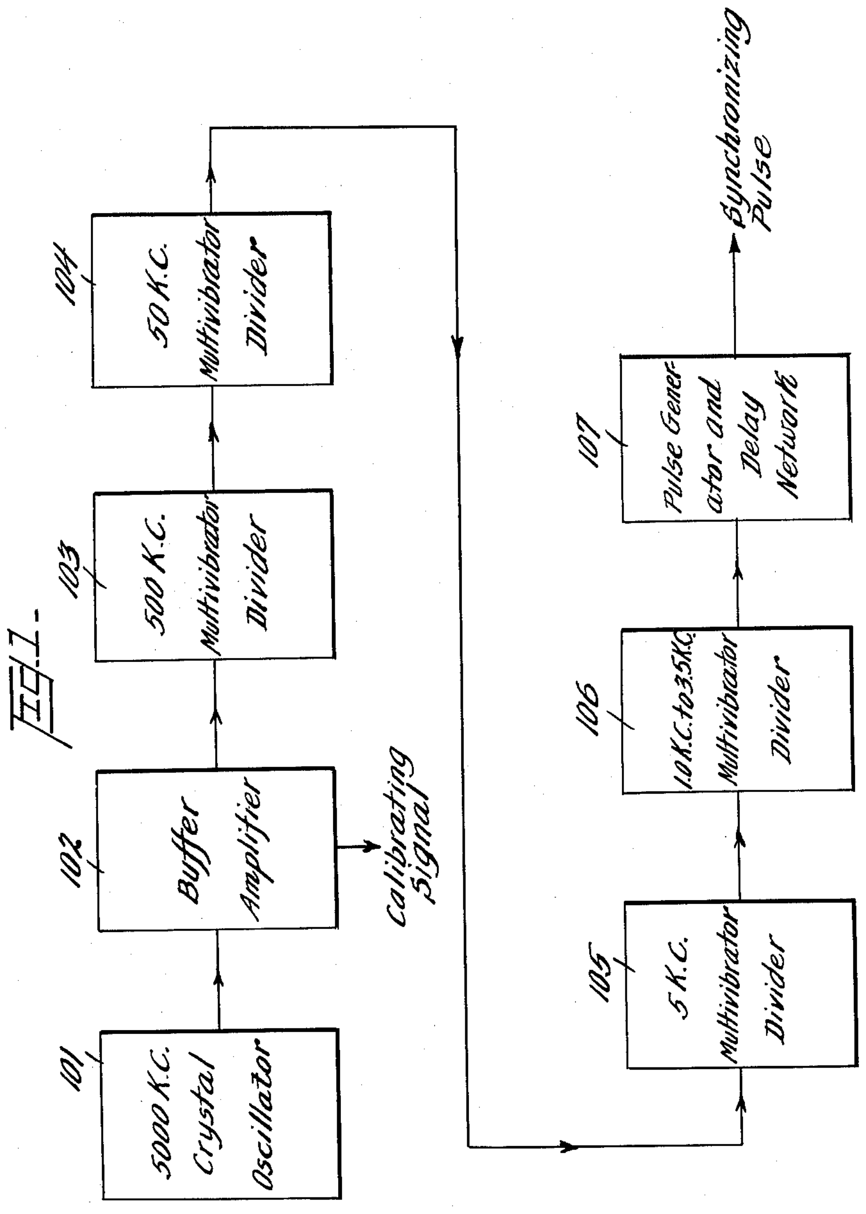
Figure 2:
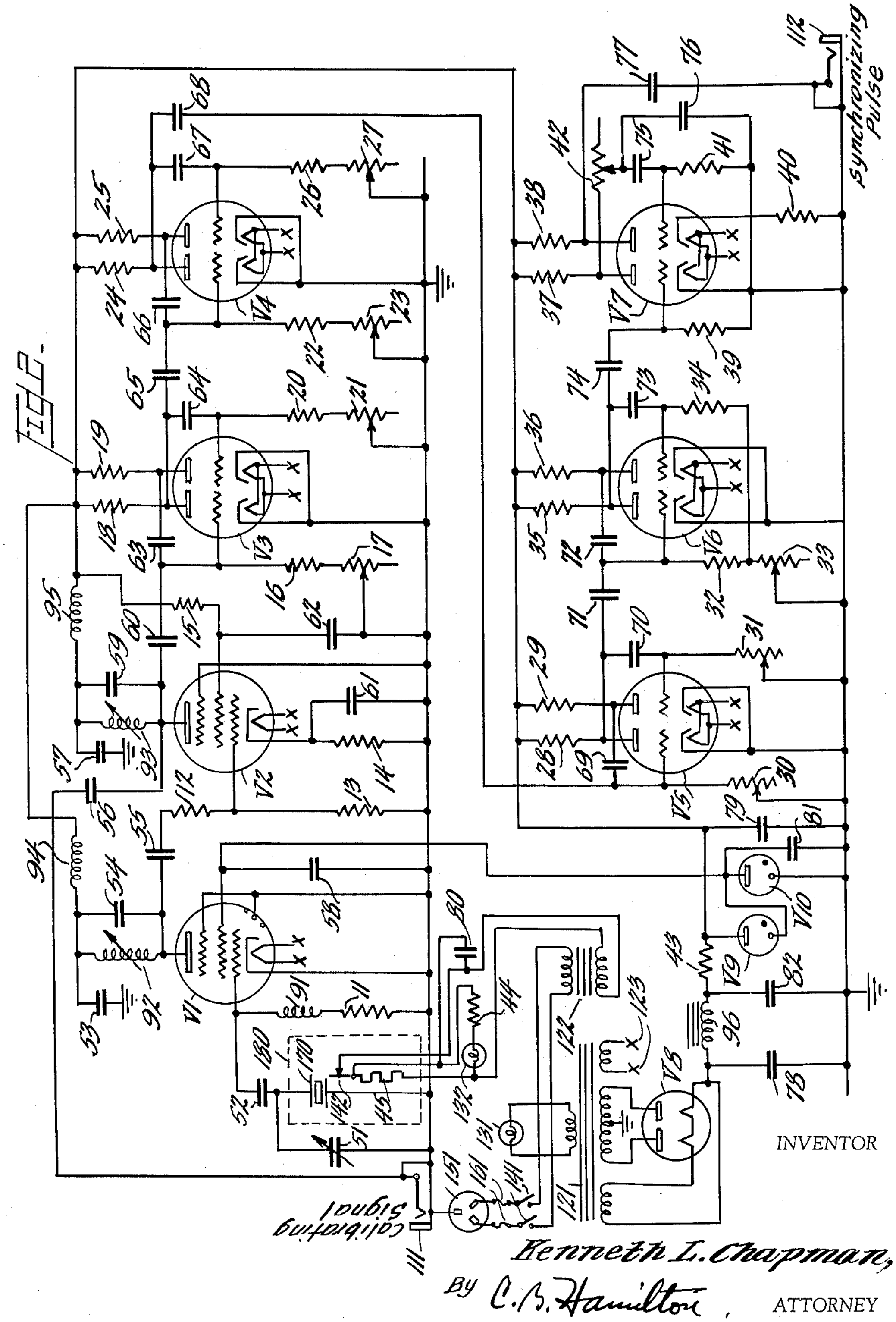

Other objects and advantages will be apparent from the following detailed description when considered in conjunction with the accompanying drawings, wherein:

Fig. 1 is a block diagram of a calibrating system embodying the present invention; and Fig. 2 is a schematic circuit diagram of a precision sweep calibrator system disclosed generally in Fig. 1.

Referring now to the drawings, attention is first directed to the block diagram of Fig. 1 wherein a general layout of a precision sweep calibrator is shown for illustrative purposes. A crystal oscillator 101 operated at 5000 kc. supplies a continuous radio frequency wave to a buffer amplifier 102 which amplifies the wave and produces a calibrating signal that can be applied to a load, such as an instrument under test. Part of this calibrating signal is fed to a first frequency dividing multivibrator 103 that produces a 500 kc. wave. A second multivibrator 104 controlled by the first produces a 50 kc. wave, and a third multivibrator 105 controlled by the second produces a 5 kc. wave. The 5 kc. wave energizes a fourth multivibrator 106 that has an output variable from 1 kc. to 3.5 kc. which is fed to a pulse forming, amplifying, and delaying network 107 to produce a synchronizing pulse used in conjunction with said calibrating signal for testing purposes, such as synchronizing the sweep voltage in a cathode ray oscilloscope.

In Fig. 2, a circuit diagram for this precision sweep calibrator is shown. A power plug 151 is adapted to receive external alternating current power for the calibrator from a suitable source and also to provide a common ground. A pair of fuses 161 are placed in the power supply line with a power switch 141 which controls the application of primary voltage to transformers 121 and 122 having an indicator lamp 131. The transformer 122 supplies electric power for controlling the temperature in a heat insulated oven 180 that encloses a crystal 170, a heating element 45, and a thermostat switch 142. If the temperature in the oven 180 goes below a predetermined value, the switch 142 automatically closes and applies voltage to the heating element 45 and a lamp 132 through a resistor 44. When the oven temperature has increased sufficiently, the thermostat switch 142 automatically opens, thereby removing the voltage applied to the heating element 45 and the lamp 132 is extinguished. A capacitor 80 is connected across the thermostat switch 142 to absorb high switching transients, thereby protecting its contacts from arcing damage.

A regulated rectifier power supply produces direct voltage for all tubes in the calibrator and comprises a duodiode rectifier tube V8, a filter network, and regulator tubes V9 and V10. The filter network includes an inductor 96, a resistor 43, and capacitors 78, 79, 81, and 82 arranged to minimize the ripple component of the direct voltage. The secondary of transformer 121 contains a high voltage center-tapped winding connected to the plates of the rectifier tube V8, a filament winding connected to the rectifier filament, and a filament winding 123 that supplies power to all tube filaments marked *x—x*.

The crystal controlled oscillator comprising a pentode tube V1 and its associated circuits produces a highly stable frequency output. The control grid circuit of the pentode tube V1 contains the crystal 170 in series with a coupling capacitor 52, said crystal being shunted by a variable capacitor 51 to provide a fine control for adjusting the crystal oscillator to an exact desired frequency; and also a gridleak branch of an inductor 91 in series with a resistor 11. The plate circuit contains a variable inductor 92 shunted by a capacitor 54 to form a tank circuit tuned to the oscillator frequency, and a decoupling network of an inductor 94 and a capacitor 53. A decoupling capacitor 58 in the screen grid circuit and a constant screen voltage tapped from the junction of the voltage regulator tubes V9 and V10 add to the stability of the oscillator.

A buffer amplifier pentode tube V2, having its control grid coupled to the crystal oscillator through a network formed by a capacitor 55 and resistors 12 and 13, amplifies the oscillator energy output and shields the oscillator from loading effects. A resistor 14 shunted by a capacitor 61 forms a cathode bias circuit for the buffer amplifier while another resistor 15 and a capacitor 62 determine its screen grid operating potential. In the plate circuit of the buffer amplifier, an inductor 95 and a capacitor 57 constitute a decoupling network while a variable inductor 93 shunted by a capacitor 59 forms a plate load circuit. The output of the buffer amplifier which is to be used as a calibrating signal, is fed through a blocking capacitor 56 to an output jack 111. The inductance 93 is adjusted to resonate the plate circuit consisting of the inductor 93, the capacitors 59 and 56, external load, and external conductors, to the frequency of the crystal oscillator; this provides efficient transfer of energy to the load and a high gain in the buffer amplifier resulting in a signal level of several hundred volts which may be applied directly to the deflecting plates of a cathode ray tube.

A part of the buffer amplifier output is fed through a capacitor 60 to a multivibrator divider circuit comprising a duo-triode tube V3 and its associated circuits, which generates a sub-harmonic frequency of the calibrating signal. The multivibrator tube V3 and duo-triode multivibrator tubes V4, V5, and V6 are connected in cascade, each producing a sub-harmonic frequency of the preceding multivibrator and being coupled together by capacitors 65, 68, and 71. Each of the multivibrator tubes V3, V4, V5, and V6 have associated therewith individual groups of resistors 16, 17, 18, 19, 20, 21 and capacitors 63—64; resistors 22, 23, 24, 25, 26, 27, and capacitors 66—67; resistors 28, 29, 30, 31, and capacitors 69—70; and resistors 32, 33, 34, 35, 36, and capacitors 72—73, respectively, which are frequency determining elements that enable the multivibrator to oscillate at a sub-multiple of a control frequency, such as the calibrating signal. The multivibrator tube V6 can be made to produce a particular sub-multiple frequency by adjusting the variable resistor 33.

The output of the multivibrator tube V6 is coupled through a capacitor 74 to a first control grid of a duo-triode tube V7 having plate load resistors 37, 38; grid leak resistors 39, 41; and a high frequency by-pass capacitor 76 associated therewith. When the signal appearing on the first control grid of the duo-triode tube V7 is positive, the plate current flow is heavy but when said signal is negative, the plate current flow is cut off. This action produces a pulse of voltage having a repetition rate corresponding to the frequency generated by the multivibrator tube V6, said pulse being coupled through a variable delay network to the second control grid of the tube V7 and amplified. The delay network comprises a variable resistor 42 and a capacitor 75 which delays the pulse with respect to the calibrating signal. The pulse is coupled through a capacitor 77 to an output jack 112 where it can be used as a synchronizing pulse, such as that used in a cathode ray oscilloscope. A negative synchronizing pulse is coupled to the output jack 112 as indicated in Fig. 2, but a positive synchronizing pulse may be obtained from a cathode resistor 40 of the tube V7.

In operating this calibrating system for comparison purposes, the power plug 151 is connected to an external alternating current source of electrical energy and the power switch 141 is closed to provide electrical power to the precision sweep calibrator. The oven 180 is automatically heated to a predetermined temperature, all tube filaments are heated, voltage is applied to all tubes, and the calibrating signal and the synchronizing pulse appear at output jacks 111 and 112, respectively, when the switch 141 is closed. When the calibrator has reached a steady operating condition, the calibrating signal is compared with a standardizing signal, such as that broadcast by the National Bureau of Standards, and is adjusted by tuning the capacitor 51 to operate at exactly the same frequency as the standard signal.

Now the calibrator is ready for use with a cathode ray oscilloscope or other instruments to be tested. The calibrating signal is coupled to the instrument under test, and the inductor 93 is tuned so that the buffer amplifier plate circuit including the external connections will resonate at the calibrating signal frequency for maximum power transfer. The synchronizing pulse is also coupled to the instrument under test and the desired sub-multiple of the calibrating signal frequency is chosen by an adjustment of the resistor 33. The amount of delay between the calibrating signal and the synchronizing pulse is selected by adjustment of the resistor 42.

The calibrator is versatile and precise, and it can be used with instruments employing triggered sweeps, start-stop sweeps, or continuous sweeps, and is particularly useful with instruments operating for short intervals and remaining quiescent between active intervals.

It is to be understood that while the embodiment disclosed and described herein is a preferred one, the invention is susceptible to many different forms, and that other instrumentalities may be substituted for those disclosed, and various changes and modifications may be made without departing from the spirit and scope of the invention.

What is claimed is:

1. In a system for producing a calibrating signal and a synchronizing pulse, an accurately adjustable continuous wave oscillator for producing the calibrating signal, a buffer amplifier coupled to the oscillator for amplifying the calibrating signal and shielding said oscillator from loading effects, means for coupling the calibrating signal from the buffer amplifier to an external circuit, a variable inductance connected in the plate circuit of the buffer amplifier for tuning said plate circuit to the calibrating signal frequency for maximum energy transfer, a plurality of multivibrators connected in cascade and energized by a portion of the calibrating signal to produce a sub-multiple frequency thereof, a pulse forming network coupled to the multivibrators and producing the synchronizing pulse having a frequency equal to the sub-multiple frequency, a delay network coupled to the pulse forming network for delaying the synchronizing pulse with respect to the calibrating signal, and means for coupling the synchronizing pulse from the delay network to the external circuit.

2. A precision sweep calibrator comprising a crystal oscillator, a buffer amplifier coupled to the oscillator for amplifying the oscillations and producing an amplified calibrating signal, tunable means coupled to the buffer amplifier output circuit for tuning it simultaneously with an external load to the calibrating signal frequency, a series of dividing circuits coupled to the buffer amplifier and under the control of the calibrating signal for producing a sub-harmonic thereof, a pulse forming network coupled to the dividing circuits for producing a synchronizing pulse having a repetition rate equal to the sub-harmonic, and means for coupling the synchronizing pulse from the dividing circuits to the external load.

3. In a calibrator, an adjustable crystal-controlled oscillator, a buffer amplifier coupled to the oscillator for producing an amplified calibrating signal, tunable means for coupling the calibrating signal from the buffer amplifier to an external circuit under test, a series of multivibrators coupled to the buffer amplifier and under control of the calibrating signal for producing a sub-harmonic thereof, a pulse forming and amplifying network coupled to the multivibrators for producing a synchronizing pulse having a repetition rate equal to the sub-harmonic, a variable delay network coupled to the pulse forming network for producing a delay between the calibrating signal and the synchronizing pulse, and means for coupling the synchronizing pulse from the delay network to the external circuit under test.

4. A precision sweep calibrator comprising an adjustable crystal oscillator, a heat insulated oven having an automatic temperature control and enclosing the crystal for stabilizing its frequency output, a buffer amplifier coupled to the oscillator for amplifying the oscillations and shielding said oscillator from external loading effects and producing a calibrating signal, tunable means for coupling the calibrating signal from the buffer amplifier to an external circuit under test, a plurality of dividing circuits connected in cascade and coupled to the buffer amplifier to produce a sub-multiple of the calibrating signal, a pulse forming network coupled to the dividing circuits and producing a synchronizing pulse having a repetition rate equal to said sub-multiple, a variable delay network coupled to the pulse forming network for shifting the synchronizing pulse with respect to the calibrating signal, and means for coupling the synchronizing pulse from the delay network to the external circuit under test.

5. A precision sweep calibrator comprising an adjustable crystal oscillator, a buffer amplifier coupled to the oscillator for amplifying the oscillations and producing a calibrating signal, a tunable tank circuit in the output of the buffer amplifier, said tank circuit coupled to an external load and tuned to the calibrating signal frequency for maximum energy transfer, a series of dividing multivibrators coupled to the buffer amplifier and having a variable frequency output that is a sub-harmonic of the calibrating signal, a pulse forming network coupled to the multivibrators and producing a synchronizing pulse having a frequency equal to the output frequency of said multivibrators, a variable delay network coupled to the pulse forming network for shifting the synchronizing pulse with respect to the calibrating signal, and means for coupling the synchronizing pulse from the delay network to the external load.

6. In a precision sweep calibrator, a crystal-controlled oscillator, a variable capacitor shunting the crystal for adjusting the frequency output thereof, a heat insulated oven having a temperature control circuit therein and surrounding said crystal, a regulated power circuit for supplying direct voltage to the oscillator, a buffer amplifier coupled to said oscillator for amplifying its oscillations and shielding it from external loading effects to produce a highly stable calibrating signal, a tunable tank circuit in the output of the buffer amplifier, said tank circuit coupled to an external load and tuned to the calibrating signal frequency for maximum energy transfer, a variable frequency multivibrator circuit coupled to the buffer amplifier and under the control of the calibrating signal for producing a sub-harmonic thereof, a pulse forming circuit coupled to the multivibrator circuit for producing a synchronizing pulse having a repetition rate equal to the sub-harmonic frequency, a variable delay network coupled to the pulse forming circuit for shifting the synchronizing pulse with respect to the calibrating signal, and means for coupling the synchronizing pulse from the delay network to the external load.

7. In a calibrator, a crystal-controlled oscillator, a buffer amplifier coupled to the oscillator for amplifying the oscillations and producing a calibrating signal, means associated with the buffer amplifier for tuning its output circuit together with external coupling elements to the calibrating signal thereby providing efficient transfer of energy and high gain in said buffer amplifier, a plurality of multivibrators connected in cascade being controlled by the calibrating signal for producing a sub-harmonic thereof, a pulse forming circuit coupled to the multivibrators for producing a synchronizing pulse having a recurrence frequency equal to said sub-harmonic, a delay network coupled to the pulse forming circuit for shifting the synchronizing pulse with respect to the calibrating signal, and means for coupling the synchronizing pulse from the delay network to an external load.

8. In a precision calibrator, a stable oscillator for producing a calibrating signal, a buffer amplifier coupled to the oscillator for amplifying the calibrating signal, means for coupling the calibrating signal output from the buffer amplifier to an external load, a variable frequency divider network coupled to the buffer amplifier and under the control of a portion of the calibrating signal for producing a variable frequency output, a pulse producing circuit coupled to the output of the variable frequency divider network for producing a synchronizing pulse having a repetition rate determined by the output of the variable frequency divider network, a variable delay network coupled to the pulse forming network for shifting the synchronizing pulse with respect to the calibrating signal, and means to couple the synchronizing pulse from the delay network to the external load.

9. In a precision sweep calibrator, a crystal-controlled oscillator, a variable capacitor shunting the crystal for adjusting a frequency output thereof, a heat insulated oven surrounding said crystal, means for controlling the temperature of said oven, a buffer amplifier coupled to said oscillator for amplifying its oscillations and shielding it from external loading effects to produce a highly stable calibrating signal, means for coupling the calibrating signal from the buffer amplifier to an external load, a variable inductor coupled to the buffer amplifier for tuning its output circuit together with the external load to the calibrating signal thereby providing efficient transfer of energy and high gain in said buffer amplifier, a series of dividing multivibrators coupled to the buffer amplifier having a variable frequency output, a pulse forming circuit coupled to the output circuit of dividing multivibrators for producing a synchronizing pulse having a repetition rate determined by the frequency output of the dividing multivibrators, and means for coupling the synchronizing pulse to the external load.

10. A precision sweep calibrator comprising an oscillator for producing a calibrating signal, a buffer amplifier coupled to the oscillator for amplifying the calibrating signal, tunable means for coupling the calibrating signal from the buffer amplifier to an external circuit under test, a plurality of frequency dividing circuits connected in cascade, means for coupling the first frequency dividing circuit to the buffer amplifier so that a portion of the calibrating signal controls the output of the plurality of frequency dividing circuits, a variable frequency dividing circuit coupled to the output circuit of the plurality of frequency dividing circuits for producing a variable frequency output, a pulse producing circuit coupled to the output circuit of the variable frequency dividing circuit for producing a synchronizing pulse having a repetition rate determined by the frequency output of the variable frequency dividing circuit, a pulse amplifier coupled to the pulse producing circuit for amplifying the synchronizing pulse, a variable delay control circuit coupled to the output circuit of the pulse amplifier for shifting the synchronizing pulse with respect to the calibrating signal, and means for coupling the synchronizing pulse from the delay circuit to the external circuit under test.

11. In a precision calibrator, a crystal-controlled oscillator including a crystal and a tube, a variable capacitor shunting said crystal for controlling the frequency output thereof, a variable inductor in the plate circuit of said oscillator tube for tuning said plate circuit to the frequency of the calibrating signal, a buffer amplifier coupled to said oscillator for amplifying said calibrating signal, a variable inductor connected in the plate circuit of said buffer amplifier for tuning said buffer amplifier to the frequency of said oscillator for maximum energy transfer, means for coupling the calibrating signal from said buffer amplifier to an external load, a plurality of multivibrators connected in cascade, means for connecting the first multivibrator to the output of the buffer amplifier so that a portion of the calibrating signal controls the output of said series of multivibrators, a variable frequency dividing circuit coupled to the output circuit of said plurality of frequency dividing circuits for producing a variable frequency output, a pulse producing circuit coupled to the output circuit of said variable frequency dividing circuit for producing a synchronizing pulse having a repetition rate determined by the frequency output of said variable frequency dividing circuit, a pulse amplifier coupled to said pulse producing circuit for amplifying the synchronizing pulse, a variable delay control circuit coupled to the output circuit of said pulse amplifier for shifting said synchronizing pulse with respect to said calibrating signal, and means for coupling said synchronizing pulse from the delay circuit to the external circuit under test.

UNITED STATES PATENTS

References Cited in the file of this patent

| | | |
|---|---|---|
| 1,894,687 | Hyland | Jan. 17, 1933 |
| 2,073,459 | Thruston | Mar. 9, 1937 |
| 2,121,359 | Luck et al. | June 21, 1938 |
| 2,408,078 | Labin et al. | Sept. 24, 1946 |
| 2,425,600 | Coykendall | Aug. 12, 1947 |
| 2,466,044 | Schoenfeld | Apr. 5, 1949 |
| 2,477,615 | Isbister | Aug. 2, 1949 |
| 2,621,295 | Lacy | Dec. 9, 1952 |